Patented Jan. 7, 1930

1,742,448

UNITED STATES PATENT OFFICE

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY

FERTILIZER MANUFACTURE

No Drawing.   Application filed April 29, 1926.   Serial No. 105,571.

Ammonium nitrate is high in desirable fertilizer ingredients, but it is objectionable for such use, however, because of its very great hygroscopic properties.

This detrimental quality, nevertheless, can be overcome by crystallizing the ammonium nitrate, together with ammonium phosphate in the proper proportions and under suitable conditions, whereby a dry, practically non-hygroscopic salt is obtained, containing not only ammoniacal and oxidized nitrogen, but also phosphoric acid ($P_2O_5$).

It has been discovered that any molecular ratio of ammonium nitrate to mono-ammonium phosphate up to $3NH_4NO_3NH_4H_2PO_4$ possesses this desirable non-hygroscopic characteristic.

For instance, salts of this type and having this quality have been prepared containing 1 molecule of nitrate to 2 of phosphate, 1½ nitrate to 2 phosphate, 1 nitrate to 1 phosphate, 1½ nitrate to 1 phosphate, 2 nitrate to 1 phosphate, and 3 nitrate to 1 phosphate, as well as intermediate mixtures.

The present invention relates to the new product, which may be satisfactorily employed as an ingredient for fertilizers, or which can be used by itself alone, and it pertains also to the process or processes for the manufacture of such products.

The above noted compositions may be prepared in a variety of ways, using either crude or pure materials.

For instance, ammonium nitrate and ammonium phosphate in the proper proportions for the production of the desired product may be dissolved in a minimum amount of water and then the latter evaporated off, whereby the required result is obtained.

Phosphoric acid, either crude or pure, and nitric acid may be mixed in the desired ratio and the requisite amount of ammonia liquor or gas passed into this mixture, and then the solution may be evaporated to dryness.

Or oxides of nitrogen, together with air, may be absorbed in phosphoric acid, and thereupon the mixed acids so produced may be neutralized with ammonia and the solution evaporated to dryness.

Or oxides of nitrogen, air and ammonia gas may be absorbed in phosphoric acid.

Or, finally, oxides of nitrogen, air, oxygen, steam or water, ammonia and volatilized $P_2O_5$ may be passed together into a precipitating chamber and through a Cottrell precipitator.

From the preceding it will be readily understood that the desired product may be manufactured in any one or more of a variety of equivalent processes varying from one another in one or more features.

A preferred method of carrying out this process and for the manufacture of the new product is as follows:

Ammonia gas, together with an excess of air, in not less than a minimum ratio of 1 to 7½, by volume is passed through a catalyst, for example, platinum-gauze heated electrically or otherwise, at the proper temperature, in the neighborhood of 600° to 800° centigrade, and under suitable conditions to produce high yields of oxides of nitrogen.

Such oxides of nitrogen, together with excess of air, using as much of the latter as may be necessary or required, in order to bring about the oxidation of the oxides of nitrogen to nitric acid, are passed through a tower, or preferably through a series of towers, through which circulates a solution of phosphoric acid, either pure or crude.

In this way, a mixture of nitric and phosphoric acids is built up to the desired proportions, as heretofore indicated, and thereupon such mixture of acids is neutralized with ammonia, or an excess of ammonia may be added to the mixed acids, and then more mixed acids, or either of them, may be added to the solution to care for or compensate for the excess ammonia.

This solution is then evaporated to dryness in any one of a number of ways, but preferably in a direct-heat drier, and in this manner satisfactory salts have been prepared of the following compositions:

| | | | |
|---|---|---|---|
| Total nitrogen | 19.5 | 21 | 21.7 |
| Ammoniacal nitrogen | 14.5 | 15 | 14.5 |
| Oxidized nitrogen | 5.0 | 6 | 7.2 |
| $P_2O_5$ | 38.5 | 35 | 36.0 |

When crude phosphoric acid is employed which has been prepared by the extraction of phosphate-rock with sulfuric acid, there are usually some reducing materials dissolved in it, but, if sufficient excess of air is used in the absorbing towers, such reducing elements are sufficiently oxidized, and the final product contains practically all nitrate nitrogen.

However, it is quite possible to have a mixed or double salt containing some nitrite without seriously affecting its desirable properties.

Although herein I have presented several ways in which the new product may be attained, it is to be understood that the invention as defined by the appended claims is not limited to the details presented and that these may be modified within relatively wide limits without departure from the invention and without the loss of any of its material benefits.

I claim:

In the process of producing crystals of ammonium nitrate and ammonium phosphate, bringing oxides of nitrogen and an excess of air into contact with phosphoric acid and water, thereby forming mixed nitric and phosphoric acids, and adding ammonia thereto.

In witness whereof I have hereunto set my hand.

HERBERT H. MEYERS.